(12) United States Patent
Statz (10) Patent No.: US 8,833,783 B2
(45) Date of Patent: Sep. 16, 2014

(54) CAM TRACK OPERABLE SIDE STEP

(75) Inventor: William A. Statz, Cross Plains, WI (US)

(73) Assignee: Sno-Way International, Inc., Hartford, WI (US)

( * ) Notice: Subject to any disclaimer, the term of this patent is extended or adjusted under 35 U.S.C. 154(b) by 182 days.

(21) Appl. No.: 13/535,423

(22) Filed: Jun. 28, 2012

(65) Prior Publication Data

US 2014/0001726 A1  Jan. 2, 2014

(51) Int. Cl.
*B60R 3/02* (2006.01)

(52) U.S. Cl.
USPC ........................................................ 280/166

(58) Field of Classification Search
CPC .......... B60R 3/00; B60R 3/002; B60R 3/007; B60R 3/02
USPC ............ 280/166, 163, 164.1, 164.2, 165, 169
See application file for complete search history.

(56) References Cited

U.S. PATENT DOCUMENTS

| | | | |
|---|---|---|---|
| 606,932 A | 7/1898 | Maxon | |
| 1,118,584 A | 11/1914 | Roebuck | |
| 1,473,858 A | 11/1923 | Koeberlin | |
| 2,153,945 A * | 4/1939 | Thelander | 182/88 |
| 2,153,946 A * | 4/1939 | Linstead et al. | 182/88 |
| 2,642,217 A * | 6/1953 | Jennings | 182/88 |
| 2,764,422 A * | 9/1956 | McDonald | 182/91 |
| 2,852,271 A * | 9/1958 | McDonald | 182/88 |
| 2,956,638 A * | 10/1960 | Bustin | 182/88 |
| 2,971,600 A * | 2/1961 | Schultz | 182/88 |
| 3,008,533 A * | 11/1961 | Haberle | 182/88 |
| 3,572,753 A | 3/1971 | Claassen | |
| 3,915,475 A * | 10/1975 | Casella et al. | 280/166 |
| 3,927,903 A * | 12/1975 | Jones | 280/166 |
| 3,955,827 A * | 5/1976 | Wonigar | 280/166 |
| 4,029,355 A * | 6/1977 | Wilhelmsen | 296/57.1 |
| 4,198,070 A | 4/1980 | Weiler | |
| 4,243,120 A * | 1/1981 | Pratt et al. | 182/98 |
| 4,369,984 A * | 1/1983 | Hagen | 280/166 |
| 5,205,603 A | 4/1993 | Burdette, Jr. | |
| 5,284,349 A | 2/1994 | Bruns et al. | |
| 6,237,927 B1 | 5/2001 | Debo | |
| 6,474,668 B2 | 11/2002 | Debo | |
| 6,655,706 B1 * | 12/2003 | Murrell | 280/166 |
| 6,659,224 B2 * | 12/2003 | Medsker | 182/91 |
| 6,663,125 B1 * | 12/2003 | Cheng | 280/166 |
| 6,955,370 B2 * | 10/2005 | Fabiano et al. | 280/163 |
| 7,025,174 B1 * | 4/2006 | Hawley | 182/88 |
| 7,219,911 B2 * | 5/2007 | Sukonthapanich et al. | 280/166 |
| 7,318,596 B2 * | 1/2008 | Scheuring et al. | 280/166 |
| 7,377,531 B2 * | 5/2008 | Fabiano et al. | 280/163 |
| 7,445,221 B2 * | 11/2008 | Kobayashi | 280/166 |
| 7,712,755 B2 * | 5/2010 | Yang et al. | 280/163 |

(Continued)

*Primary Examiner* — Katy M Ebner
(74) *Attorney, Agent, or Firm* — Reinhart Boerner Van Deuren s.c.

(57) ABSTRACT

A vehicle step for access to a vehicle with the vehicle including a chassis frame and a body panel. The vehicle step includes a cam track frame, a step assembly configured for guided reciprocal movement between the first and second plates of the cam track frame. The step assembly includes a pair of cam rods with each cam rod coupled to the step frame and configured to slidingly engage a first and second cam track defined in the cam track frame to guide the step assembly. A step latch is disposed in the step frame of the step assembly with the step latch configured for one of retaining the step assembly in a stowed position and releasing the step assembly to an extended position.

19 Claims, 8 Drawing Sheets

(56) References Cited

U.S. PATENT DOCUMENTS

| | | |
|---|---|---|
| 7,841,609 B2 | 11/2010 | Okada et al. |
| 7,934,737 B2 | 5/2011 | Okada et al. |
| 8,157,277 B2 | 4/2012 | Leitner et al. |
| 8,342,550 B2 * | 1/2013 | Stickles et al. ............... 280/166 |
| 2003/0071434 A1 * | 4/2003 | Budd ............................ 280/166 |
| 2008/0224438 A1 | 9/2008 | Okada et al. |
| 2008/0238019 A1 | 10/2008 | Okada et al. |
| 2010/0102528 A1 | 4/2010 | Stickles et al. |
| 2010/0140897 A1 | 6/2010 | Yang et al. |
| 2011/0133426 A1 | 6/2011 | Coochesfahani |
| 2012/0025485 A1 | 2/2012 | Yang et al. |
| 2013/0193666 A1 * | 8/2013 | Kibler .......................... 280/163 |

* cited by examiner

CAM TRACK OPERABLE SIDE STEP

BACKGROUND OF THE INVENTION

1. Field of the Invention

This invention relates to vehicle steps, and more particularly to a cam track guided step for trucks.

2. Background of the Invention

Vehicles, such as trucks, particularly pick-up trucks, are typically configured higher than a passenger car. Such configuration makes it difficult to enter or exit a truck either from the passenger cabin or in the cargo bay of a pick-up truck. Entry and exit from the truck is difficult particularly for older people, short people, and in some cases women.

It is known in the industry to provide after-market devices to assist in helping people ingress or egress a truck. One such device is a running board. Such running boards typically are placed in a fixed position and cannot be moved. Other devices, such as fold-down steps can be coupled to the truck and typically they have a stowed position that may or may not be on the outside body of the truck. Other devices, include an auxiliary step that is coupled to the body of a vehicle, such as a pick-up truck that pivots under the body. Such auxiliary step typically is used for ingress and egress to a passenger compartment and is coupled to the cabin door as illustrated in U.S. Pat. No. 3,572,753. Such device, mounted below the chassis frame of the vehicle reduces the ground clearance for such vehicle which is a disadvantage.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is desirable that all of the aforesaid advantages be achieved without incurring any substantial relative disadvantage.

SUMMARY OF THE INVENTION

The disadvantages and limitations of the background art discussed above are overcome by the present disclosure.

There is disclosed a vehicle step for access to a vehicle. The vehicle typically includes a chassis frame and a body panel. The vehicle step includes a cam track frame and a step assembly configured for guided reciprocal movement within the cam track frame. The step assembly is maintained in the cam track frame in a stowed position and can be moved to an extended position. The vehicle step is mounted on the vehicle by coupling the vehicle step to the chassis frame in a space defined between the chassis frame and the body panel of the truck. The vehicle step can be mounted on either side of the vehicle. It is also contemplated that a vehicle step is mounted on both sides of the vehicle. It is also contemplated that multiple vehicle steps per side can be mounted on the vehicle. When in the stowed position the vehicle step generally does not reduce the vehicle ground clearance. The vehicle step is aligned with the vehicle chassis in a perpendicular aspect and when in the extended position, the step assembly extends from the side of the vehicle typically between the passenger compartment and a rear wheel of, for example, a pick-up truck. In such deployment, the step facilitates ingress to the cargo bed of the vehicle.

The cam track frame includes a first plate and a second plate with the first and second plates coupled together in a parallel, spaced apart relationship with a plurality of traverse members. A first cam track is defined in each of the first and second plates proximate the traverse members. The first cam track defines a curved portion at one end of the track which is the lowest portion of the plates. A second cam track is defined in each of the first and second plates a spaced distance from the first cam track. The second cam track defines a downwardly extending portion at one of the track which also is at the lowest portion of the plates.

Both tracks in each plate are configured with predetermined curves to guide the step assembly from the stowed position to the extended position and to avoid other parts of the vehicle and to clear the lowest portion of the body panel of the vehicle.

A step assembly is configured for guided reciprocal movement between the first and second plates. The step assembly includes a step frame configured for sliding movement in the cam track frame and has two ends. At one end of the step frame, a step pad is coupled to the step frame. At another end of the step frame, a pair of cam rods are disposed and coupled to the step frame. Each cam rod, extends through the first and second plates of the cam track frame. Each of the cam rods are configured to slidingly engage one of the first and second cam tracks. When the step assembly moves between the first and second plates, the step assembly is guided by the cam rods in the first and second cam tracks with the vehicle step coupled to the chassis frame of the vehicle. The cam rods guide the step assembly when the step assembly is moved from the stowed position to the extended position and as determined by user from the extended position back to the stowed position. The two cam rods are spaced apart in different longitudinal planes and are configured that at least one cam rod moves further in the first cam track when the other cam rod moves in the second cam track.

In another embodiment, the vehicle step also includes a step latch disposed in the step frame of the step assembly. The step latch includes a latch plate coupled to each of the first and second plates. Such latch plate is fixed to the cam track frame opposite the traverse members. The step latch also includes a latch rod having at least one end configured with threads which end extends out of the step frame and includes a latch tab coupled proximate the other end of the latch rod.

The step latch also includes a pivot tube fixed at a right angle to the latch rod and configured to pivot about a pivot pin coupled to the step frame. The position of the pivot tube and the length of the latch rod are configured such that the latch tab extends out of the step assembly to engage the latch plate and maintain the step assembly in a stowed position. The configuration of the latch rod and pivot tube also are such that movement of the threaded end of the latch rod can disengage the latch tab from the latch plate and allow the step assembly to move from the stowed position to the extended position as guided by the cam rods.

A bias member is coupled to the latch rod and configured to bias the latch rod for the latch tab to engage the latch plate and releasably retain the step assembly in the stowed position. The bias member can be, for example, a torsion spring or a compression spring.

In another embodiment, the vehicle step includes a step frame configured as one of a hollow tube and a channel. In either case, the latch rod is disposed within the step frame.

In one embodiment, a bracket is coupled to one of the first second plates of the cam track frame and is configured to couple the vehicle step to the chassis frame of the vehicle. The vehicle step is aligned perpendicular to the chassis frame with the vehicle step disposed along the chassis frame in a space between the chassis frame and the body panel of the vehicle.

There is further provided a vehicle step for access to a vehicle with the vehicle including a chassis frame and a body panel. The vehicle step includes a cam track frame comprising a first plate and a second plate, with the first and second plates couples together in a parallel, spaced apart relationship with a plurality of traverse members.

The first cam track of the cam track frame is defined in each of the first and second plates proximate the traverse members with the first cam track defining a curved portion at one end of the track. A second cam track is defined in each of the first and second plates a spaced distance from the first cam track, with the second cam track defining a downwardly extending portion at one end of the track.

A step assembly is configured for guided reciprocal movement between the first and second plates with the cam track frame coupled to the chassis frame. A step assembly includes a pair of cam rods with each cam rod extending through a step frame and configured to slidingly engage one of the first and second cam tracks to guide the step assembly.

A step latch is disposed in the step frame of the step assembly. The step latch is configured for one of retaining the step assembly in a stowed position and releasing the step assembly to an extended position.

There is also provided a method to facilitate ingress and egress to a pick-up truck with the pick-up truck including a chassis frame and a body panel with a space defined between the chassis frame and body panel. The method includes the steps of positioning a vehicle step in the space, coupling the vehicle step to the vehicle chassis aligned perpendicular to the chassis, and releasing the step latch and extending the vehicle step beyond the vehicle body panel facilitating one of ingress and egress to the pick-up truck.

The vehicle step includes a cam track frame including a pair of shape plates. The plates are coupled together in a parallel, spaced apart relationship, with each plate defining a first and second cam track.

The vehicle step also includes a step assembly configured for guided reciprocal movement between the first and second plates. The step assembly includes a pair of cam rods with each cam rod coupled to each of the first and second plates and configured to slidingly engage one of the first and second cam tracks to guide the step assembly. A step latch is disposed in the step frame of the step assembly. The step latch is configured to retain the step assembly in a stowed position and release the step assembly to an extended position.

The method includes moving the step assembly to the stowed position between the vehicle body panel and the chassis and engaging the step latch with the cam track frame to retain the step assembly in the cam track frame mounted in the space. The vehicle step, utilized in this method, includes the two cam rods spaced apart on different longitudinal planes and configured that at least one cam rod moves further in the first cam track than the other cam rod moves in the second cam track.

The apparatus of the present invention is of a construction which is both durable and long lasting, and which will require little or no maintenance to be provided by the user throughout its operating lifetime. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

This disclosure describes an apparatus and method for facilitating the ingress and egress to a vehicle, such as a pick-up truck. The device is a cam track side step for the vehicles.

Figure 3:
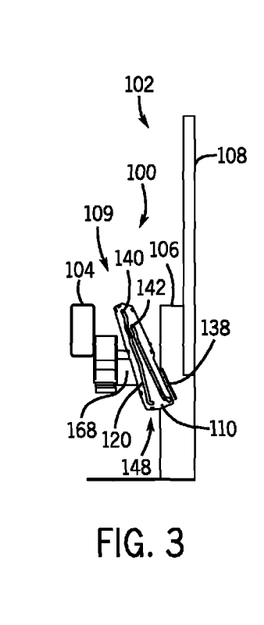
FIG. 3 is an illustration of the cam track vehicle step illustrated in FIG. 2 coupled to a vehicle chassis of a pick-up truck in the stowed position.
Figure 4:
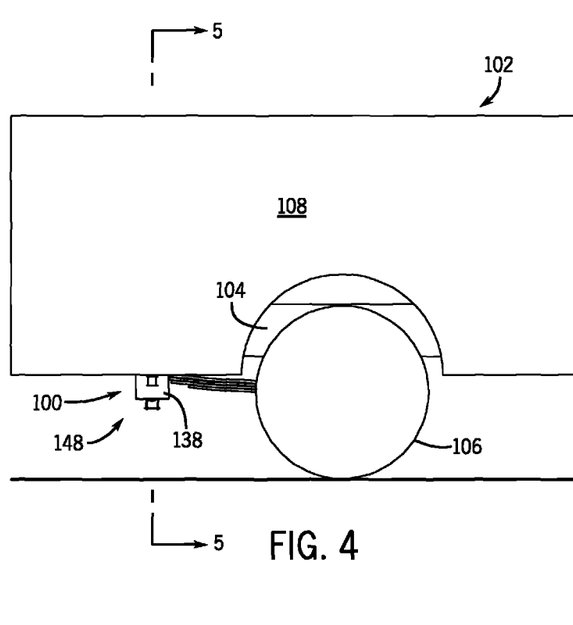
FIG. 4 is a partial side view of the pick-up truck illustrated in FIG. 3 with the cam track vehicle step in the stowed position.
Figure 5:
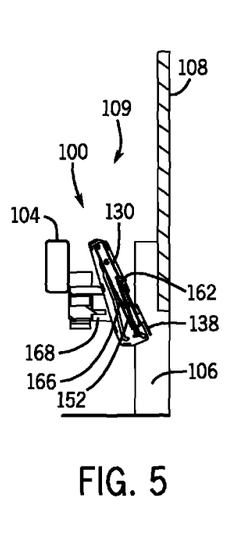
FIG. 5 is a cross-section of the cam track vehicle step illustrated in FIG. 4 along the line 5-5.
Figure 7:
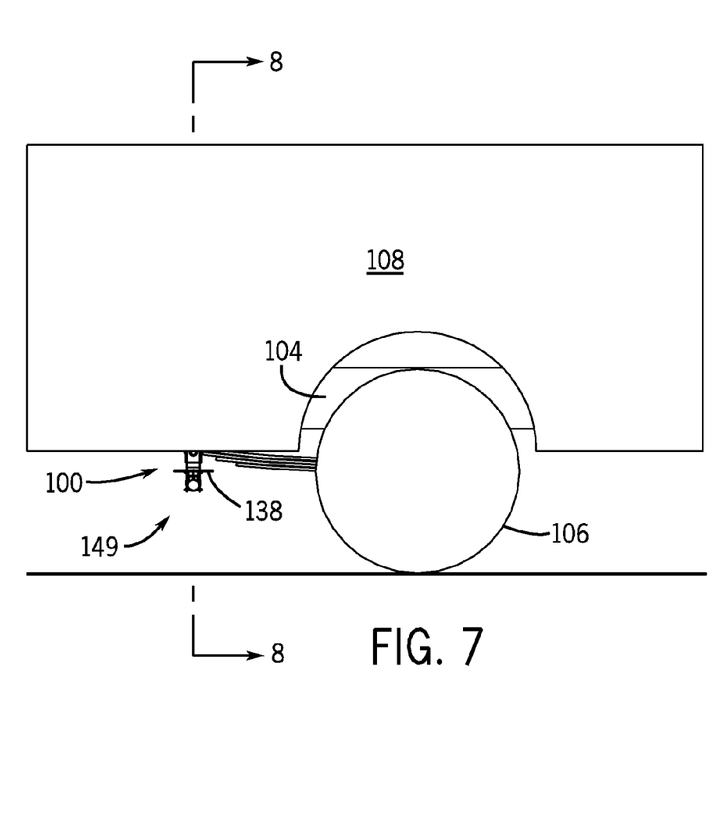
FIG. 7 is a partial side view of the pick-up truck illustrated in FIG. 6 with the cam track vehicle step in the extended position.
Figure 8:
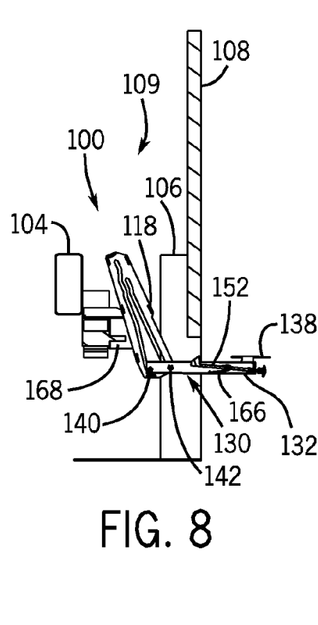
FIG. 8 is a cross-section of the cam track vehicle step illustrated in FIG. 7 along the line 8-8.

Referring to the FIGS. 1-16, a vehicle step 100 is coupled to the chassis frame 104 of a vehicle 102. The coupling can be by welding or nuts and bolts resulting in a semi-permanent attachment to the chassis frame 104. A typical arrangement is for the vehicle step 100 to be positioned between the chassis frame 104 and the body panel 108 of the vehicle 102 (see FIGS. 3 and 6). The chassis frame 104 and the body panel 108 defines a space 109 in which the vehicle step 100 is disposed (see FIGS. 3 and 6). The vehicle step 100 is aligned at a right angle to the chassis frame 104 and when in a stowed position 148 little if any of the vehicle seat 100 is visible (see FIGS. 3 and 4). When the vehicle step 100 is in an extended position 149 a step assembly 130 and associated step pad 138 extends from the side of the vehicle allowing ingress or egress to, for example the cargo bed of the pick-up truck (see FIGS. 6-8).

It should be understood that other vehicles such as an SUV or a flatbed truck can utilize the disclosed vehicle step 100 as determined by user or manufacturer of the vehicle. Also, in a typical arrangement, the vehicle step 100 is positioned between the passenger compartment of a vehicle 102 and a rear wheel 106 of the vehicle. The vehicle step can be mounted on either side of the vehicle. It is also contemplated that a vehicle step is mounted on both sides of the vehicle. It is also contemplated that multiple vehicle steps per side can be mounted on the vehicle.

Figure 1:
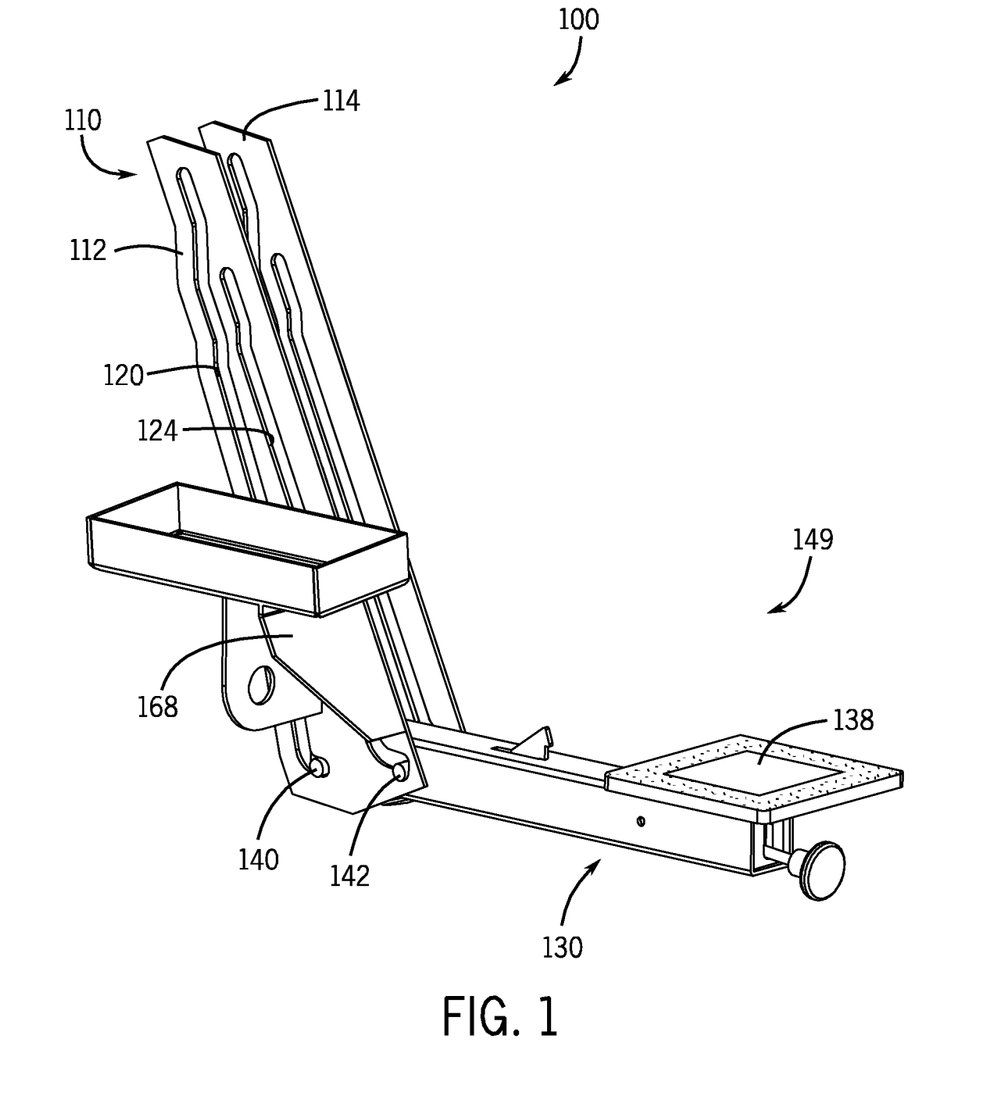
FIG. 1 is a perspective, left front view of an exemplary embodiment of a cam track vehicle step for a vehicle, with the cam track vehicle step in an extended position.
Figure 2:
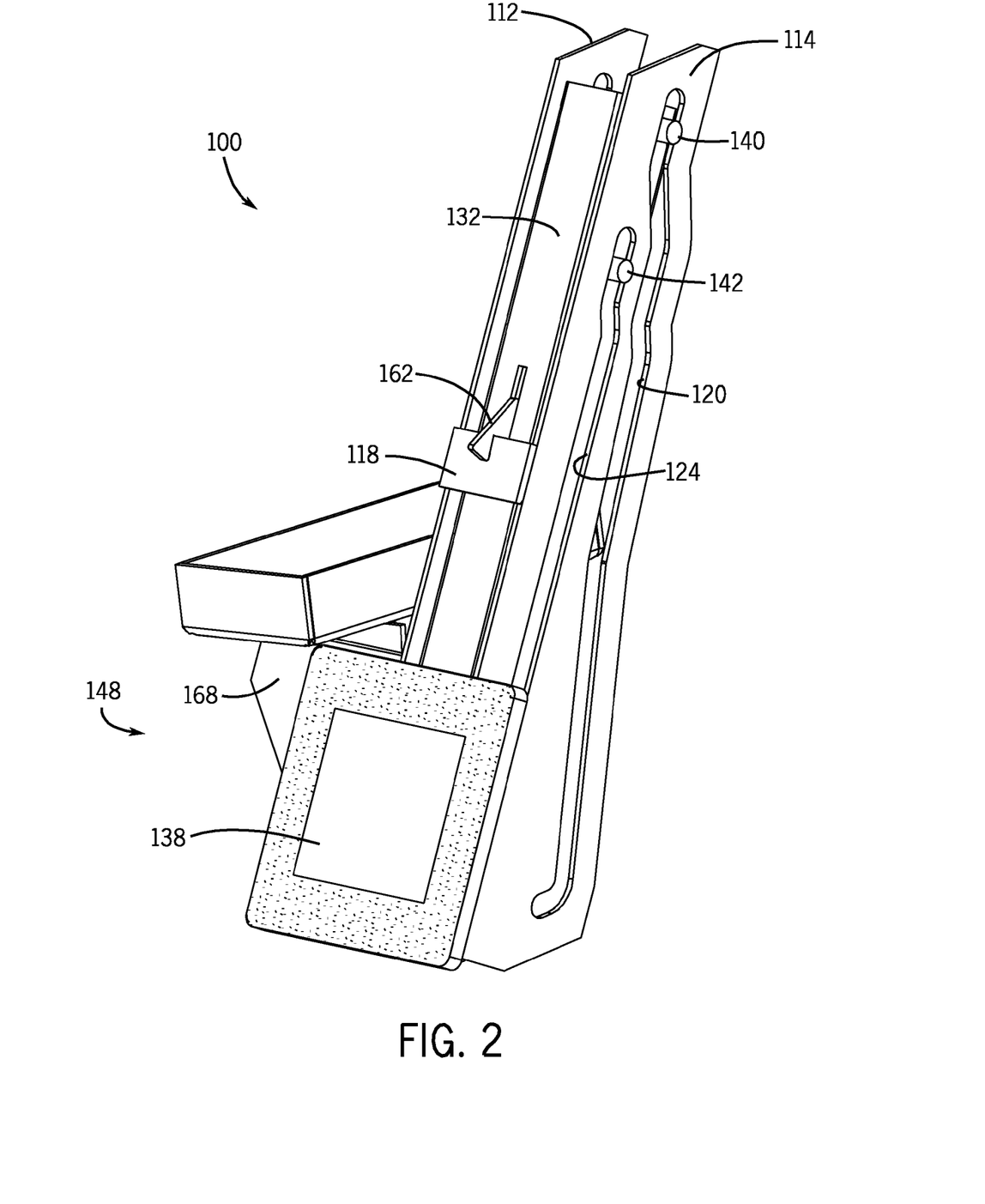
FIG. 2 is a perspective, right front view of the cam track vehicle step illustrated in FIG. 1, with the cam track vehicle step in a stowed position.

The cam track vehicle step 100 (also referred to as "vehicle step") includes a cam track frame 110, and a step assembly 130 (see FIGS. 1 and 2). The step assembly 130 reciprocally moves, in a guided cam path between a stowed position 148 and an extended position 149. It should be understood that the movement of the step assembly 130 between the two positions, the stowed position 148 and the extended position 149 can be accomplished by a manual operation or actuators, such as an electric motor and associated linkage.

Figure 9:
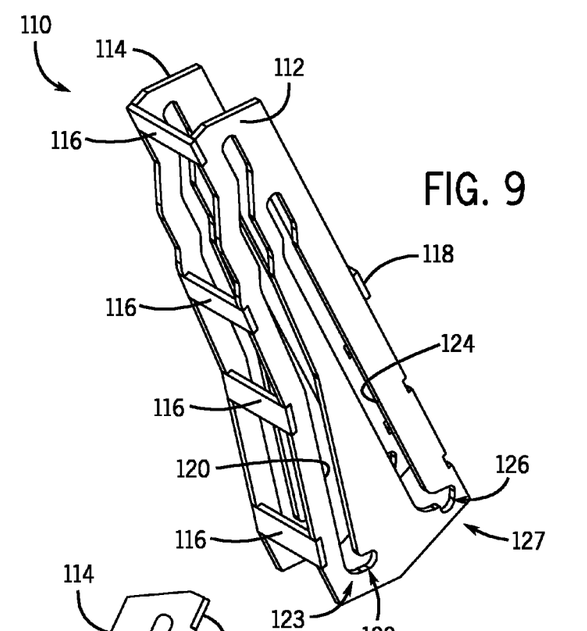
FIG. 9 is a perspective, left rear view of cam track frame of the cam track vehicle step illustrated in FIGS. 1 and 2.
Figure 10:
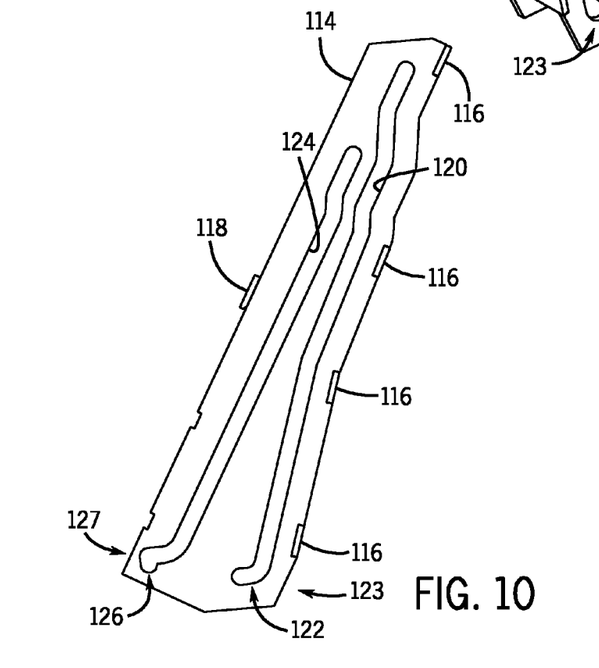
FIG. 10 is a side plan view of a plate of the cam track frame illustrated in FIG. 9.
Figure 11:
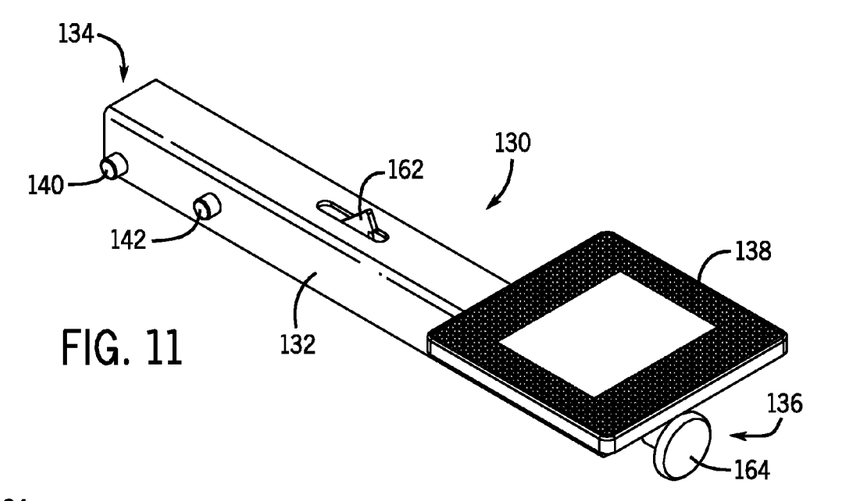
FIG. 11 is a perspective view of a step assembly of the cam track vehicle step illustrated in FIGS. 1 and 2.

Referring to FIGS. 9 and 10, the cam track frame 110 of the vehicle step 100 includes a first plate 112 and a second plate 114. The first and second plates are coupled together in a parallel, spaced apart relationship with a plurality of traverse members 116. The traverse members typically are welded to the two plates 112, 114 at appropriately spaced locations along the back edge of the plates.

Each of the first and second plates 112, 114 define cam tracks (see FIG. 10). A first cam track 120 is defined in each of the first and second plates 112, 114 proximate the traverse members 116. The first cam track 120 is configured with various curves and dips which facilitate the movement of the step assembly 130 to avoid various portions of the vehicle 102 when the step assembly 130 is moving from one position to another position. The first cam track further defines a curved portion 122 at one end 123 of the first cam track 120. The curved portion typically is at the lowest end of the plates when the cam track frame 110 is coupled to the chassis frame 104.

Each of the first and second plates 112, 114 also define a second cam track 124 which is a spaced distance from the first cam track 120. The second cam track 124 also is configured with curves and dips that in conjunction with the first cam track guides the step assembly 130 in its reciprocal movement between the stowed and extended positions. The second cam track 124 also defines a downwardly extending portion 126 at one end 127 of the second cam track 124. Such end of the track 127 is also the lowest portion of the plates when the cam track frame 110 is coupled to the chassis frame 104. It should be noted that different vehicles may require different configurations of the first and second tracks 120, 124 to avoid various portions of the specific vehicle.

Referring to FIGS. 11-14, a step assembly 130 is configured for guided reciprocal movement between the first and second plates 112, 114. The step assembly 130 includes a step frame 132 configured for sliding movement in the cam track frame 110 and has two ends 134, 136. A step pad 138 is coupled to the step frame 132 at one end 136 of the step frame 132. When the step assembly 130 is in the extended position 149 the step pad 138 extends from the side of the vehicle to facilitate the ingress and egress of a person onto the vehicle.

The step frame 132 also includes a pair of cam rods 140, 142 disposed proximate the other end 134 of the step frame 132. Each cam rod 140, 142 is coupled to the step frame 132 and are configured to slidingly engage one of the first and second cam tracks 120, 124 (see FIGS. 1 and 2). Each cam rod 140, 142 is coupled to the step frame 132. In one embodiment, the cam rods 140, 142 extend through the step frame 132. In another embodiment, cam rods 140, 142 are attached to the respective sides of the step frame 132. In either case, the cam rods 140, 142 are configured to slidingly engage one of the first and second cam tracks 120, 124. The step assembly 130 moves between the first and second plates 112, 114, guided by the cam rods 140, 142 in the first and second cam tracks 120, 124.

Figure 6:
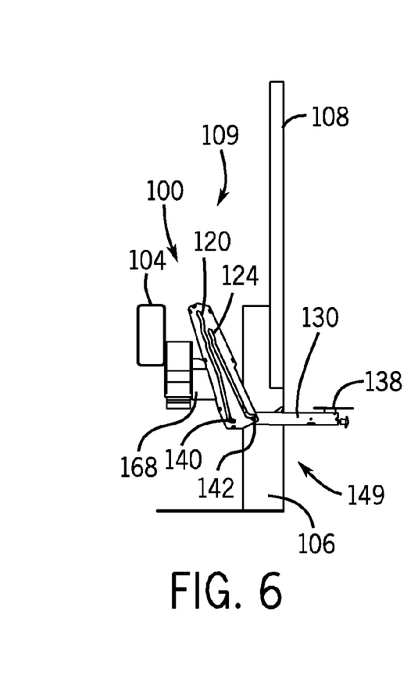
FIG. 6 is an illustration of the cam track vehicle step illustrated in FIG. 1 coupled to a vehicle chassis of a pick-up truck in the extended position.

The curved portion 122 and the downwardly extending portion 126 of each of the first and second cam tracks 120, 124 facilitate the positioning of the step assembly 130 in the extended position 149 (see FIGS. 1 and 6). When the step assembly 130 is in the extended position 149 the cam rod 142 drops into the downwardly extending portion 126 of the second cam track 124 in each of the plates 112,114. In such position, the cam rod 142 acts as a pivot or fulcrum about which the step frame 130 moves when a person steps on the step pad 138. However, because of the curved portion 122 in the first cam track 120 of each of the plates 112, 114, the cam rod 140 is forced against the respective plates on each side of the cam track frame 110. As such, the weight of a user on the step plate 138 will not deflect the step frame 132 more than is allowed by the movement of the cam rod 140 in the curved portion 122 of the first cam track 120.

Figure 12:
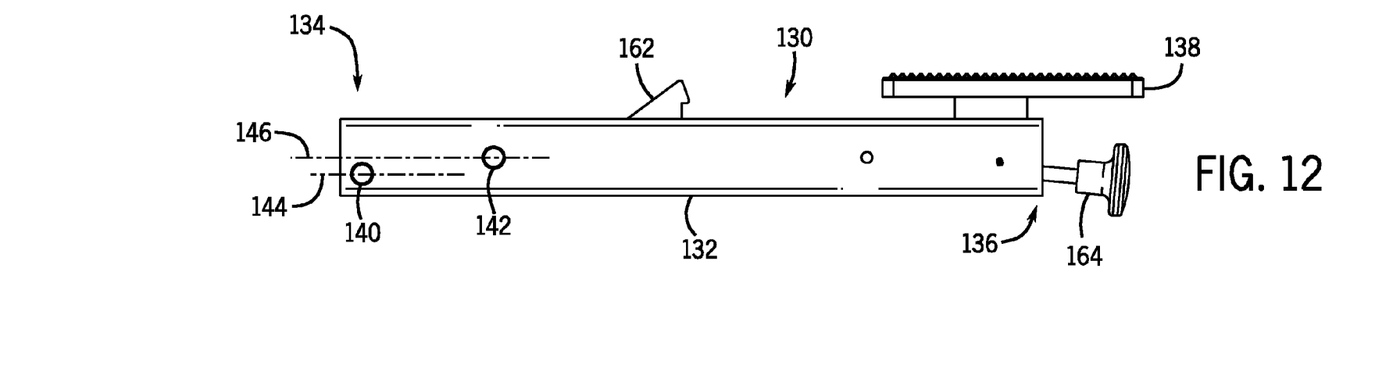
FIG. 12 is a side plan view of the step assembly illustrated in FIG. 11.
Figure 13:
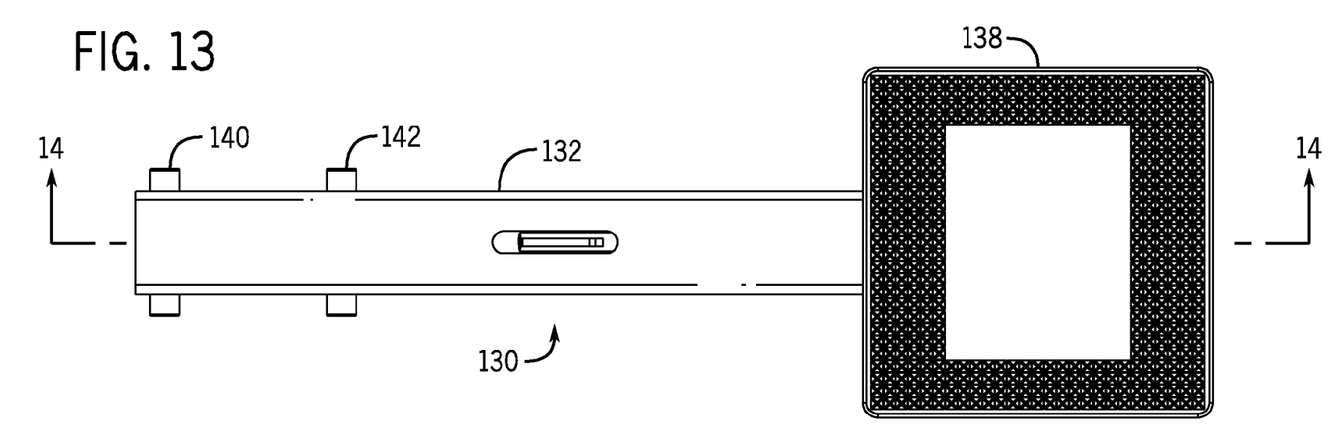
FIG. 13 is a top view of the step assembly illustrated in FIG. 11.

The cam rods 140, 142 are spaced apart on different longitudinal planes 144, 146 on each side of the step frame 132 of the step assembly 130 (see FIG. 12). Because of the geometry and the layout of the cam tracks 120, 124, the cam rod 140 in the first cam track 120 moves further than the other cam rod 142 moves in the second cam track 124. As shown in the figures, the first cam track 120 is longer than the second cam track 124 (see FIG. 10). It should also be noted that the distance between the first cam track 120 and the second cam track 124 is further apart at the lower end of each of the tracks 123 and 127 than at the other ends of the tracks. Such configuration of the tracks also facilitates the movement of the step assembly 130 from the stowed position 148 to the extended position 149 as described above.

Figure 14:
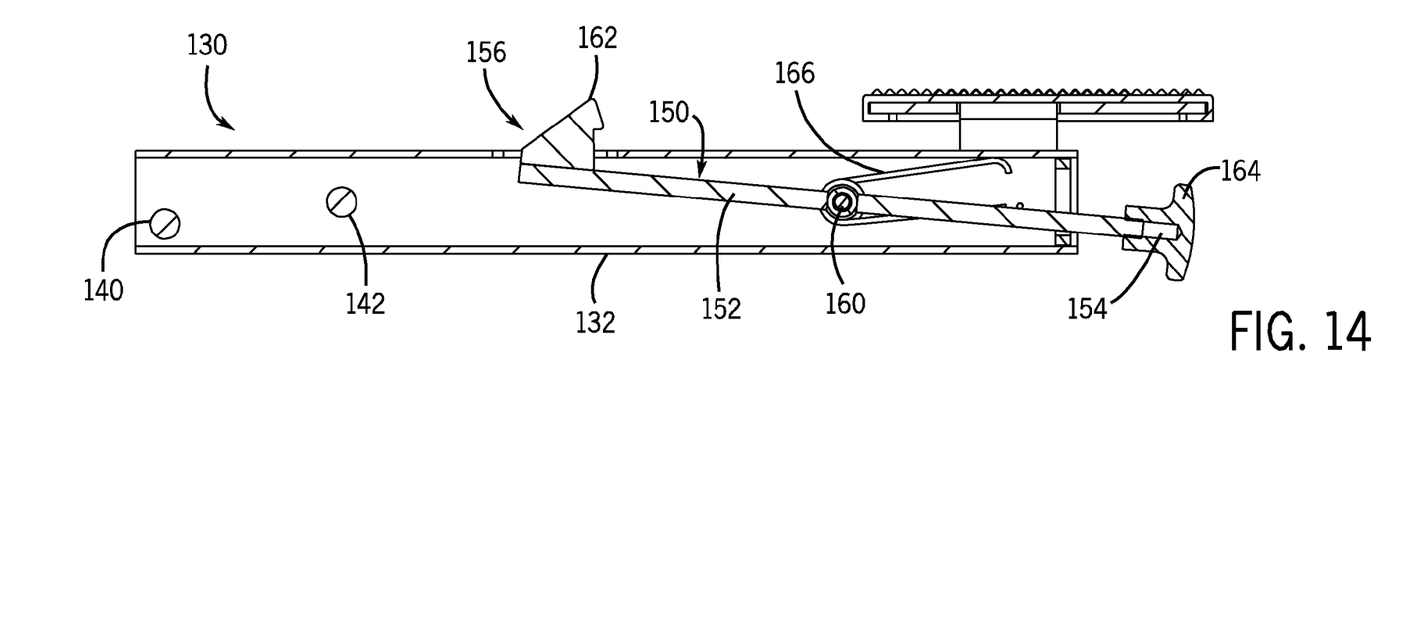
FIG. 14 is a cross-section view of the step assembly illustrated in FIG. 13 along the line 14-14.

In one embodiment the vehicle step 100 also includes a step latch 150 which is disposed in the step frame 132 of the step assembly 130 (see FIG. 14). The step frame 132 may be configured as a hollow tube or a channel with the step latch 150 disposed within the hollow tube or the channel. The step latch 150 includes a latch plate 118 coupled to each of the first and second plates 112, 114. The latch plate 118 is fixed to the two plates along an edge of the plates opposite the traverse members 116.

Figures 15, 16:
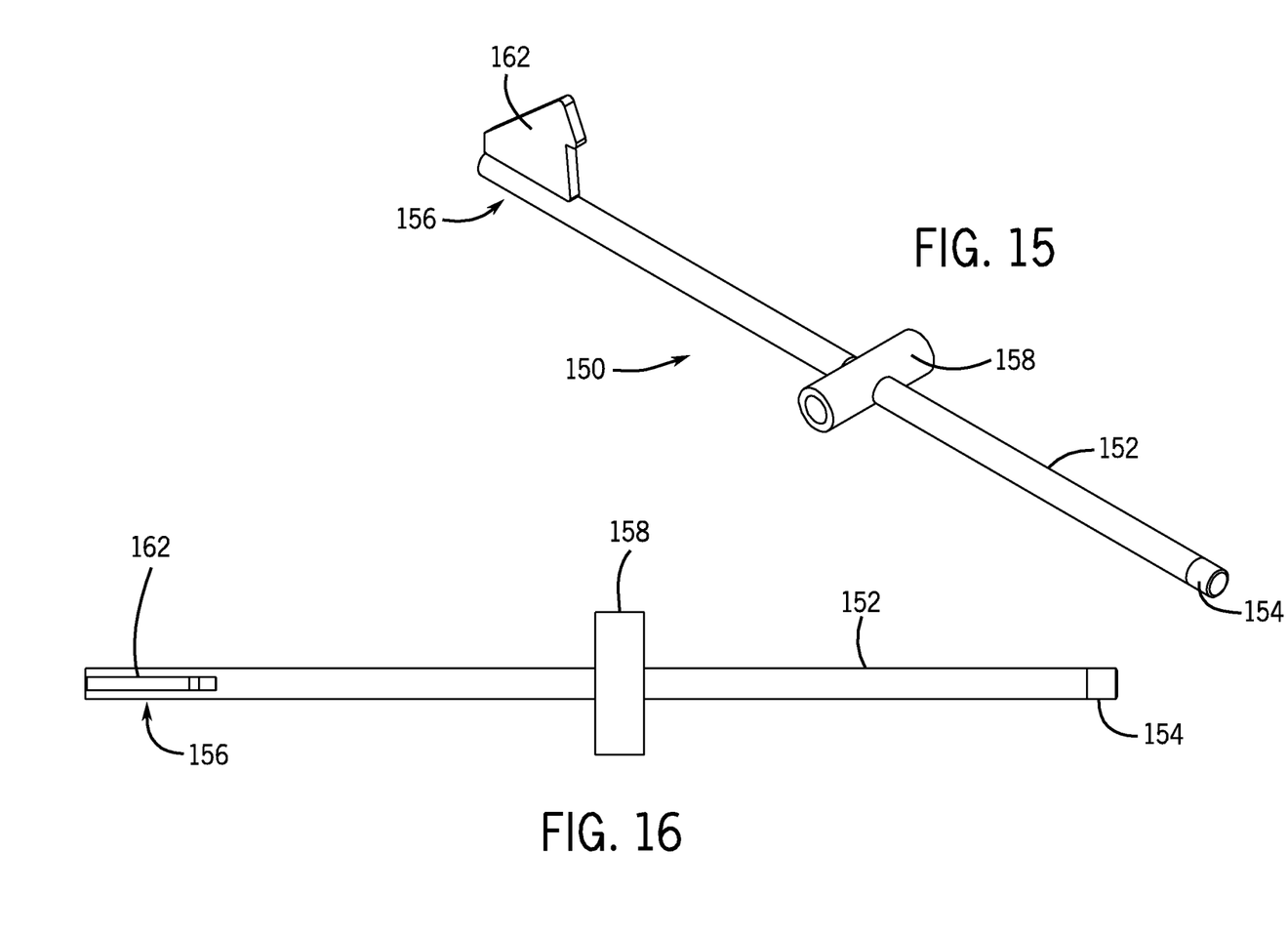
FIG. 15 is a perspective view of a step latch of the cam track vehicle step illustrated in FIGS. 1, 2, and 14.
FIG. 16 is a top view of the step latch illustrated in FIG. 15.

Referring to FIGS. 14-16, a latch rod 152 is configured with one end 154 defining threads with that end extending out of the step frame 132. A latch tab 162 is coupled proximate the other end 156 of the latch rod. A pivot tube 158 is fixed at a right angle to the latch rod 152 at a location between the two ends 154, 156 of the latch rod 152 and is configured to pivot about a pivot pin 160 coupled to the step frame 132.

The latch rod 152 is of a length that fits within the step frame 132, but for the portion that extends outside of the step frame 132. A knob 164 is threaded onto the threaded end 154 of the latch rod 152 and is used by an operator to manipulate the latch rod 152.

The step latch 150 is configured to retain the step assembly 130 in the stowed position 148 and release the step assembly 130 to allow it to move to the extended position 149 (see FIGS. 1, 2, 3, and 6). In such operation, a user, holding the knob 164 on the latch rod 152 pivots the latch rod 152 about the pivot pin 160 in the pivot tube 158. Movement of the knob 164 disengages the latch tab 162 from the latch plate 118 allowing the step assembly 130 to move through the cam track frame 110 as guided by the cam rods 140, 142 within the first and second cam tracks 120, 124. When moving to the stowed position 148 from the extended position 149 the above-described procedure is reversed. When the step assembly 130 is moved up into the cam track frame 110 the operator will engage the latch tab 162 with the latch plate 118 and secure the step assembly 130 in the cam track frame 110.

A bias member 166 is coupled to the latch rod 152 and is configured to bias the latch rod 152 to maintain the latch tab 162 in engagement with the latch plate 118 (see FIGS. 6 and 14). The bias member 166 can be a torsion spring or a compression spring that biases the latch rod 152 against the step frame 132 of the step assembly 130. The bias member 166 is configured to maintain the latch tab 162 in position and to releasably retain the step assembly 130 in the stowed position 148. When moving from the stowed position 148 to the extended position 149, the movement of the knob 164 at the end of the latch rod 152 overcomes the bias force exerted by the bias member 166 on the latch rod 152.

Referring to FIGS. 1-8, a bracket 168 is coupled to the cam track frame 110, for example coupled to one of the first and second plates 112, 114 with the bracket 168 configured to couple the vehicle step 100 to the chassis frame 104 of the vehicle 102. The preferred alignment of the bracket 168 and the vehicle step 100 is perpendicular to the chassis frame 104.

The vehicle step 100 and its components, are composed of materials such as steel but in appropriate applications, could be composed of other metal such as aluminum. A nonskid material is applied to the step pad 138 and the knob 164 is composed of appropriate material such as plastic, rubber, metal or a combination of at least two such materials.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present mechanism has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the mechanism as described herein may be made, none of which depart from the spirit or scope of the present disclosure. The particular embodiments and applications were chosen and described to provide the best illustration of the principles of the mechanism and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A vehicle step for access to a vehicle, the vehicle including a chassis frame and a body panel, the vehicle step comprising:
   a cam track frame comprising:
      a first plate;
      a second plate, with the first and second plates coupled together in a parallel, space-apart relationship with at least one traverse member;
      a first cam track defined in each of the first and second plates proximate the traverse member, the first cam track extending from a first end to a second end, with the first cam track defining a curved portion proximate the second end of the track; and
      a second cam track defined in each of the first and second plates a spaced distance from the first cam track, the second cam track extending from a first end to a second end, with the second cam track defining a downwardly extending portion proximate the second end of the track; and
   a step assembly configured for guided movement between the first and second plates, the step assembly comprising:
      a step frame configured for sliding movement in the cam track frame and having two ends;
      a step pad coupled to the step frame at one end; and
      a pair of cam rods disposed proximate another end of the step frame, with each cam rod coupled to the step frame and configured to slidingly engage one of the first and second cam tracks,
   wherein the step assembly moves between the first and second plate, guided by the cam rods in the first and second cam tracks with the vehicle step coupled to the chassis frame;
   wherein the second cam track is configured to be located between the first cam track and the body panel of the vehicle; and
   wherein the first end of the first cam track is configured to be located higher than the first end of the second cam track when the vehicle step is in an installed configuration relative to the vehicle.

2. The vehicle step of claim 1, wherein the step assembly is configured to move between a stowed configuration and an extended configuration.

3. The vehicle step of claim 1, further comprising a step latch disposed in the step frame of the step assembly, the step latch comprising:
   a latch plate coupled to each of the first and second plates; and
   a latch rod having at least one end configured with threads which end extends out of the step frame and a latch tab coupled proximate another end of the latch rod;
   a pivot tube fixed at a right angle to the latch rod and configured to pivot about a pivot pin coupled to the step frame; and
   a bias member coupled to the latch rod and configured to bias the latch rod for the latch tab to engage the latch plate, wherein the latch tab releasably retains the step assembly in the stowed configuration.

4. The vehicle step of claim 3, wherein the step frame is configured as one of a hollow tube and a channel.

5. The vehicle step of claim 4, with the latch rod within the step frame.

6. The vehicle step of claim 1, further comprising a bracket coupled to one of the first and second plates, with the bracket configured to couple the vehicle step to the chassis frame of the vehicle.

7. The vehicle step of claim 6, wherein the bracket and vehicle step are configured to be aligned perpendicular to the chassis frame.

8. The vehicle step of claim 6, wherein the bracket is configured to be disposed along the chassis frame in a space between the chassis frame and the body panel of the vehicle.

9. The vehicle step of claim 1, with the two cam rods spaced apart on different longitudinal planes and configured that at least one cam rod moves further in the first cam track than the other cam rod moves in the second cam track.

10. The vehicle step of claim 1, wherein the vehicle step is configured to be coupled to the vehicle; and
   wherein with the vehicle step coupled to the vehicle, the first end of the first cam track is a first horizontal distance from the first end of the second cam track, the second end of the first cam track is a second horizontal distance from the second end of the second cam track, and the first horizontal distance is less than the second horizontal distance.

11. A vehicle step for access to a vehicle, the vehicle including a chassis frame and a body panel, the vehicle step comprising:
   a cam track frame comprising:
      a first plate;
      a second plate, with the first and second plates coupled together in a parallel, space-apart relationship by at least one traverse member;
      a first cam track defined in each of the first and second plates proximate the at least one traverse member, the first cam track extending from a first end to a second end; and
      a second cam track defined in each of the first and second plates a spaced apart from the first cam track, the second cam track extending from a first end to a second end;
   a step assembly configured to move between a stowed configuration and an extended configuration, the step assembly including a pair of cam rods with each cam rod move along one of the first and second cam tracks to guide the step assembly; and
   a step latch disposed in the step frame of the step assembly, the step latch configured for one of retaining the step assembly in a stowed position and releasing the step assembly to an extended position;
   wherein the vehicle step is configured to be coupled to a vehicle; and
   wherein with the vehicle step coupled to the vehicle, the first end of the first cam track is a first horizontal distance from the first end of the second cam track, the second end of the first cam track is a second horizontal distance from the second end of the second cam track, and the first horizontal distance is less than the second horizontal distance.

12. The vehicle step of claim 11, further comprising a bracket coupled to one of the first and second plates, with the bracket configured to couple the vehicle step to the chassis frame of the vehicle.

13. The vehicle step of claim 12, wherein the bracket and vehicle step are configured to be aligned perpendicular to the chassis frame.

14. The vehicle step of claim 12, wherein the bracket is configured to be disposed along the chassis frame in a space between the chassis frame and the body panel of the vehicle.

15. The vehicle step of claim 11, wherein the two cam rods are spaced apart on different longitudinal planes and are configured so that at least one cam rod moves further in the first cam track than the other cam rod moves in the second cam track.

16. The vehicle step of claim 11, wherein the second cam track is configured to be located between the first cam track and the body panel of the vehicle; and
   wherein the first end of the first cam track is configured to be located higher than the first end of the second cam track when the vehicle step is in an installed configuration relative to the vehicle.

17. A method to facilitate ingress to a pick-up truck, the truck including a chassis frame and a body panel with a space defined between the chassis frame and body panel, the method comprising:
   positioning a vehicle step in the space, the vehicle step comprising:
      a cam track frame including a pair of shaped plates, with the plates coupled together in a parallel, space-apart relationship, with each plate defining a first and second cam track;
      a step assembly configured for movement between the first and second plates, the step assembly including a pair of cam rods with each cam rod coupled to each of the first and second plates and configured to slidingly engage one of the first and second cam tracks to guide the step assembly; and
      a step latch disposed in the step frame of the step assembly, the step latch configured to retain the step assembly in a stowed configuration and to release the step assembly to an extended configuration;
   coupling the vehicle step to the vehicle chassis, with at least a portion of the vehicle step located in the space; and
   releasing the step latch and extending the vehicle step beyond the vehicle body panel to the extended configuration facilitating ingress to the pick-up truck, wherein the step of extending the vehicle step beyond the vehicle body panel includes rotating the step pad from a generally vertical orientation when the vehicle step is in the stowed configuration to a generally horizontal orientation when the vehicle step is in the extended configuration.

18. The method of claim 17, wherein the body panel has a lower peripheral edge, wherein the step assembly includes a step pad, the method further comprising moving the vehicle step to the stowed configuration wherein at least a portion of the step pad is located higher than the lower peripheral edge of the body panel when the vehicle step is in the stowed configuration; and engaging the step latch with the cam track frame to retain the step assembly in the space defined between the chassis frame and the body panel.

19. The method of claim 17, wherein the two cam rods are spaced apart on different longitudinal planes and configured such that at least one cam rod moves further in the first cam track than the other cam rod moves in the second cam track.

* * * * *

UNITED STATES PATENT AND TRADEMARK OFFICE
CERTIFICATE OF CORRECTION

PATENT NO. : 8,833,783 B2
APPLICATION NO. : 13/535423
DATED : September 16, 2014
INVENTOR(S) : William A. Statz Page 1 of 1

It is certified that error appears in the above-identified patent and that said Letters Patent is hereby corrected as shown below:

On the Title Page:

Item 73 (Assignee)
"Sno-Way International, Inc." should read --DoMore Truck Company, LLC--

Signed and Sealed this
Nineteenth Day of January, 2016

Michelle K. Lee
*Director of the United States Patent and Trademark Office*